Patented May 30, 1950

2,510,025

UNITED STATES PATENT OFFICE 2,510,025

ALKYL OR ALLYL TRICHLOROPHENYL CARBONATES

Clarence L. Moyle, Clare, Mich., assignor to The Dow Chemical Company, Midland, Mich., a corporation of Delaware No Drawing. Application February 2, 1948,
Serial No. 5,892

3 Claims. (Cl. 260—463)

The present invention relates to seed disinfectants and is particularly concerned with the carbonates of 2,4,5-trichlorophenol and compositions and methods in which they are employed for preventing the decay of seeds and damping-off of seedlings by seed and soil borne pathogens.

The carbonates of 2,4,5-trichlorophenol have the formula:

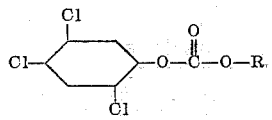

wherein R represents a member of the group consisting of the lower alkyl radicals containing from 1 to 8 carbon atoms, inclusive, and allyl.

Many disinfectant materials have been proposed and used with varying degrees of success to protect seeds and seedlings from decay and damping-off, respectively. Some have had a limited use due to their instability, low effectiveness, odor, or toxicity to the skin of humans. A particular disadvantage of many seed disinfectant materials has been their relatively high vapor pressure whereby they are rapidly volatilized from compositions in which they are employed and from surfaces to which they are applied so that an extended protection against fungi is not obtained. Another problem has been the adverse effect which certain disinfectants exert upon the germination of the seed; thus the attacking fungus organisms may be controlled but only with a simultaneous decrease in the number of seeds which germinate.

According to this invention it has been found that the carbonates of 2,4,5-trichlorophenol may be applied to seeds in amounts required to control fungus or related organisms without causing injury to the seeds and newly emerged seedlings, or adversely affecting the germination of the seed. The compounds are stable, of low volatility, and of low solubility in water. Such properties enable them to exert an extended residual toxicity against fungus organisms. This toxicity, together with the tolerance of seeds and seedlings for the compounds, makes possible a satisfactory and economical seed treating operation.

The new compounds may be incorporated as a 10 to 50 per cent by weight constituent of a dust mixture. They may be compounded with any suitable finely divided solid carrier such as bentonite, volcanic ash, diatomaceous earth, fuller's earth, starch, chalk, wood flour, talc, etc. As much as 60–75 per cent of the disinfectant may be employed in such mixtures. The dusts may be prepared either by grinding the constituents together in a hammer mill or by wetting the carrier with a solution of the disinfectant in a suitable solvent and evaporating the mixture to dryness.

The treatment of the seed may be accomplished by shaking the dust product with the seed. Usually from 0.5 to 6 ounces of the dust disinfectant per bushel of seed is employed depending upon the proportion of the disinfectant in the dust, the tolerance of the seed to be treated for the selected disinfectant, and the effectiveness of the disinfectant for the organisms concerned.

Furthermore, the compounds may be dispersed in water, or incorporated with various dispersing, wetting, and sticking agents and subsequently diluted to form aqueous disinfectants of any desired concentration. With such compostions, disinfection may be accomplished by wetting the seed prior to planting.

The compounds of the invention may be incorporated with other conventional carriers such as solvents, oil-in-water emulsions, or aerosols, either as the sole toxic ingredient or in combination with other toxicants. Fertilizing materials such as ammonium phosphate, potassium acid phosphate and the like may be employed as constituents of the disinfectant mixtures.

Seeds which may be treated substantially as described include cotton, radish, beet, celery, Swiss chard, carrot, bean, onion, pea, barley, and buckwheat.

Example 1

50 parts by weight of allyl 2,4,5-trichlorophenyl carbonate and 50 parts by weight of fuller's earth were mixed together and hammermilled through a 1/16 inch screen. Cotton seed was dusted with this product in the amount of 0.75 ounce per bushel of seed. Both treated and untreated cotton seed were planted in soil heavily infected with the organisms *Pythium spp.*, *Fusarium spp.*, and *Rhizoctonia solani*. From the treated cotton seeds there was obtained an emergence of 96 per cent. Of the emerged seedlings 96 per cent were disease free. Untreated cotton seeds planted as a control gave an emergence of 67 per cent. Of these seedlings 33 per cent were disease free.

Example 2

50 parts by weight of ethyl 2,4,5-trichlorophenyl carbonate was dissolved in methyl chloride and 50 parts by weight of fuller's earth wet with the solution. This mixture was evaporated to dryness and hammermilled through a 1/16 inch screen. Cotton seed was uniformly dusted with the product in the amount of 1.5 ounces per bushel of seed. The dusted cotton seed was planted in soil previously inoculated with the disease organisms *Pythium spp.*, *Fusarium spp.*, and *Rhizoctonia solani*. Such treated cotton seeds gave an emergence of seedlings of 90 per cent, 92 per cent of which were disease free. Untreated cotton seeds planted as a control in the same infected soil gave an emergence of 53 per cent, 49 per cent of the seedlings being disease free.

Example 3

25 parts by weight of n-amyl 2,4,5-trichlorophenyl carbonate was dissolved in methyl chloride and 75 parts by weight of fuller's earth wet with the solution. This mixture was evaporated to dryness and hammermilled through a 1/16 inch screen. Alaska pea seed was dusted with the resulting product in the amount of 3 ounces per bushel of seed. Both treated and untreated pea seeds were planted in soil infected with the organisms *Pythium spp.*, *Fusarium spp.*, and *Rhizoctonia solani*. The treated pea seeds gave an emergence of 67 per cent while untreated seeds gave an emergence of 21 per cent.

The carbonates of 2,4,5-trichlorophenol are novel and constitute a further feature of the present invention. Representative carbonates have been prepared and identified, and found to be white crystalline solids or colorless oils, relatively stable to light and air, somewhat soluble in certain organic solvents, insoluble in others, and relatively insoluble in water. In addition to being useful as seed disinfectant materials they are adapted to be employed as preservatives for paper, paint, and wood, and as intermediates in the preparation of more complex organic derivatives.

A convenient method of preparation comprises reacting an aliphatic chlorocarbonate, such as ethyl chlorocarbonate, allyl chlorocarbonate, n-amyl chlorocarbonate, etc., with an alkali metal salt of 2,4,5-trichlorophenol. Substantially equimolecular proportions of the 2,4,5-trichlorophenate and of the chlorocarbonate have been found to give good yields, although these proportions are not critical. Upon completion of the reaction, the desired product may be obtained in substantially pure form by either fractional distillation under reduced pressure or recrystallization of the crude reaction product.

In the preferred method of operation a chlorocarbonate is reacted with a suspension of sodium 2,4,5-trichlorophenate in an inert liquid such as benzene, chlorobenzene or ethylbenzene. The chlorocarbonate is added portionwise to the trichlorophenate with stirring, which permits a close control of the reaction temperature whereby decomposition due to excessive heat of reaction is avoided. The temperature of reaction is not critical and good yields are obtained when operating at temperatures between 40° and 120° C., the reaction mixture often being stirred for an hour or longer to insure completion of the reaction. The mixture is then filtered while hot to remove the precipitated sodium chloride. The filtrate is distilled under reduced pressure, first to remove the solvent and small amounts of phenolic impurities, and then to obtain the product.

Example 4

43.9 grams of sodium 2,4,5-trichlorophenate was suspended in 100 milliliters of chlorobenzene. 21.7 grams of ethyl chlorocarbonate was added portionwise with stirring over a period of ten minutes, the temperature gradually rising to 80° C. This mixture was stirred at 60°–80° C. for one hour, and subsequently filtered to remove the precipitated sodium chloride. The sodium chloride residue was washed with 25 milliliters of chlorobenzene and the combined filtrates distilled under reduced pressure, first at 85 millimeters pressure to remove the solvent, and then at 8 millimeters pressure to obtain the white crystalline ethyl 2,4,5-trichlorophenyl carbonate. Following recrystallization from petroleum ether, ethyl 2,4,5-trichlorophenyl carbonate was found to have a melting point of 56°–57° C.

Example 5

66 grams of sodium 2,4,5-trichlorophenate was suspended in 150 milliliters of ethylbenzene and 36.2 grams of allyl chlorocarbonate added to the mixture over a period of ten minutes with some cooling. The reaction mixture was stirred during the addition of the chlorocarbonate and thereafter for one-half hour at 50°–60° C. The mixture was then filtered hot to remove precipitated sodium chloride. The filtrate was distilled under reduced pressure to recover the solvent, and the residue crystallized from cyclohexane to obtain allyl 2,4,5-trichlorophenyl carbonate having a melting point of 62.5° C.

Example 6

44 grams of sodium 2,4,5-trichlorophenate was suspended in dry toluene and 30 grams of n-amyl chlorocarbonate added as described in Example 4. The mixture was stirred for one hour at 65°–85° C., and subsequently filtered hot to remove the precipitated sodium chloride. The colorless oil, n-amyl 2,4,5-trichlorophenyl carbonate, was separated from the filtrate by fractional distillation and found to have a density of 1.38 at 25° C.

By substituting other chlorocarbonates for those shown in Examples 4–6, there is obtained compounds such as propyl 2,4,5-trichlorophenyl carbonate, n-butyl 2,4,5-trichlorophenyl carbonate, secondarybutyl 2,4,5-trichlorophenyl carbonate, secondaryamyl 2,4,5-trichlorophenyl carbonate, n-hexyl 2,4,5-trichlorophenyl carbonate, n-heptyl 2,4,5-trichlorophenyl carbonate and n-octyl 2,4,5-trichlorophenyl carbonate. These compounds may be employed in the treatment of seeds substantially as described for the allyl, ethyl and n-amyl derivatives.

I claim:

1. The carbonates of 2,4,5-trichlorophenol having the formula:

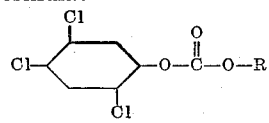

wherein R represents a member of the group consisting of the lower alkyl radicals containing from 1 to 8 carbon atoms, inclusive, and allyl.

2. Ethyl 2,4,5-trichlorophenyl carbonate.
3. Allyl 2,4,5-trichlorophenyl carbonate.

CLARENCE L. MOYLE.

REFERENCES CITED

The following references are of record in the file of this patent:

UNITED STATES PATENTS

| Number | Name | Date |
| --- | --- | --- |
| 1,991,329 | Mills | Feb. 12, 1935 |
| 2,327,338 | Carswell | Aug. 24, 1943 |
| 2,430,017 | Houk | Nov. 4, 1947 |

FOREIGN PATENTS

| Number | Country | Date |
| --- | --- | --- |
| 15,361 of 1894 | Great Britain | June 15, 1895 |
| 685,331 | France | Mar. 31, 1930 |
| 360,405 | Great Britain | Oct. 30, 1931 |